US007310780B2

(12) United States Patent
Diering et al.

(10) Patent No.: US 7,310,780 B2
(45) Date of Patent: Dec. 18, 2007

(54) METHODS, SYSTEMS AND COMPUTER PROGRAM PRODUCTS FOR VISUALLY TETHERING RELATED GRAPHICAL OBJECTS

(75) Inventors: Stephen M. Diering, Raleigh, NC (US); Joseph E. Firebaugh, Apex, NC (US); Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/640,938

(22) Filed: Aug. 14, 2003

(65) Prior Publication Data

US 2005/0039145 A1 Feb. 17, 2005

(51) Int. Cl.
*G06F 17/00* (2006.01)
(52) U.S. Cl. .................. 715/764; 715/762; 715/763
(58) Field of Classification Search ........ 715/862–864, 715/858, 861, 854, 855
See application file for complete search history.

(56) References Cited

U.S. PATENT DOCUMENTS

| 5,592,600 | A | | 1/1997 | De Pauw et al. ............ 395/140 |
| 5,634,095 | A | * | 5/1997 | Wang et al. ................. 715/763 |
| 5,680,530 | A | | 10/1997 | Selfridge et al. ........... 395/140 |
| 5,751,965 | A | | 5/1998 | Mayo et al. ........... 395/200.54 |
| 5,768,552 | A | | 6/1998 | Jacoby ....................... 395/334 |
| 5,835,085 | A | | 11/1998 | Eick et al. ................... 345/326 |
| 5,874,957 | A | * | 2/1999 | Cline et al. ................. 715/786 |
| 6,237,006 | B1 | * | 5/2001 | Weinberg et al. ....... 707/103 R |
| 6,272,672 | B1 | * | 8/2001 | Conway ..................... 717/107 |
| 6,279,017 | B1 | * | 8/2001 | Walker ....................... 715/529 |
| 6,380,937 | B1 | | 4/2002 | Dong et al. ................. 345/440 |
| 6,380,951 | B1 | * | 4/2002 | Petchenkine et al. ....... 715/736 |
| 6,486,899 | B1 | | 11/2002 | Bush, Jr. .................... 345/855 |
| 6,496,209 | B2 | | 12/2002 | Horii .......................... 345/853 |
| 6,628,304 | B2 | * | 9/2003 | Mitchell et al. ............ 715/734 |
| 6,629,097 | B1 | * | 9/2003 | Keith ............................. 707/5 |
| 6,661,431 | B1 | * | 12/2003 | Stuart et al. ................ 715/733 |
| 6,850,253 | B1 | * | 2/2005 | Bazerman et al. .......... 715/734 |
| 6,918,096 | B2 | * | 7/2005 | Hugh .......................... 715/854 |
| 6,928,436 | B2 | * | 8/2005 | Baudel ........................... 707/6 |
| 6,941,359 | B1 | * | 9/2005 | Beaudoin et al. ........... 709/221 |
| 7,006,960 | B2 | * | 2/2006 | Schaumont et al. .......... 703/15 |
| 7,103,854 | B2 | * | 9/2006 | Fuchs et al. ................ 715/855 |
| 2001/0055018 | A1 | | 12/2001 | Yaginuma et al. .......... 345/440 |
| 2002/0038218 | A1 | | 3/2002 | Senay ........................... 705/1 |
| 2002/0109685 | A1 | | 8/2002 | Nakagawa et al. ......... 345/440 |

(Continued)

FOREIGN PATENT DOCUMENTS

DE 19959692 12/1999

OTHER PUBLICATIONS

ILOG Jviews 5.5, Graph Layout User's Manual, pp. i-x, (Dec. 2002).

(Continued)

*Primary Examiner*—Tadesse Hailu
(74) *Attorney, Agent, or Firm*—Myers Bigel Sibley & Sajovec, P.A.

(57) ABSTRACT

Methods, systems and computer program products are configured to display graphical objects on an electronic display by providing a tether that visually relates two spaced apart graphic objects on the display, with the tether configured to be less visually prominent than the objects that it indicates are related.

54 Claims, 9 Drawing Sheets

U.S. PATENT DOCUMENTS

| | | | | |
|---|---|---|---|---|
| 2002/0140707 | A1* | 10/2002 | Samra et al. | 345/619 |
| 2002/0154177 | A1 | 10/2002 | Barksdale et al. | 345/853 |
| 2002/0171662 | A1 | 11/2002 | Lee | 345/593 |
| 2003/0011601 | A1 | 1/2003 | Itoh et al. | 345/440 |
| 2003/0020764 | A1 | 1/2003 | Germain et al. | 345/853 |
| 2003/0174165 | A1* | 9/2003 | Barney | 345/747 |
| 2005/0039132 | A1* | 2/2005 | Germain et al. | 715/736 |
| 2006/0129939 | A1* | 6/2006 | Nelles et al. | 715/736 |

OTHER PUBLICATIONS

ILOG Jviews 5.5, Graph Layout User's Manual, *Chapter 6, Automatic Label Placement*, pp. 339-390, (Dec. 2002).

Bauer, *Defining Structural Descriptions*, Kybemetes, vol. 9, No. 3, pp. 207-216, (2 sheets), Abstract (1980).

Nguyen, *Visualizing Behavior of Objects*, AAA95A062289, TDB vol. 38, No. 11, pp. 329-333, (2 sheets), Abstract (1995).

Torres et al., *A Formal approach to the Specification of Graphic Object Functions*, Computer Graphics Forum, vol. 13, No. 3, pp. C/371-C/380, (1 sheet), Abstract (1994).

\* cited by examiner

METHODS, SYSTEMS AND COMPUTER PROGRAM PRODUCTS FOR VISUALLY TETHERING RELATED GRAPHICAL OBJECTS

FIELD OF THE INVENTION

The present invention relates generally to displaying data on an electronic display or other display device. More particularly, the present invention relates to topological displays of objects on graphical user interfaces.

BACKGROUND OF THE INVENTION

A wide variety of computer operating systems and computer application programs incorporate, display and/or perform operations on data. With the advent and expanded use of graphical user interfaces over the last fifteen or so years, it has become possible to display increased data to a user of a computer via various graphic formats. However, due to the relatively limited real estate available to the user interface, sometimes a label for a respective object may be positioned further away from its intended or target "owner" object or positioned so that it may appear to overlap another object so that there may be some confusion as to what the label is associated with or referring to. In the past, to attempt to overcome this problem, the label for an owner object has been positioned in a predetermined relative direction away from its target or owner object. For example, a topological node label can be positioned to the south of its respective "owner" node icon. Unfortunately, this technique may not adequately use the available screen real estate and/or may inhibit a user's ready recognition or cognizance of what object belongs to what label. Thus, there remains a need for improved graphical user interfaces that allow users to more readily discern the relationship between two objects without unduly cluttering the display.

SUMMARY OF THE INVENTION

Embodiments of the present invention provide for methods, systems and/or computer program products that connect a first (typically a primary or owner object) with a related second object using a visual tether.

Embodiments of the present invention include methods for displaying graphical objects on an electronic display. The methods include: (a) displaying a first object on an electronic display and an associated second object so that the second object is spaced apart a distance from the first object; and (b) extending a tether between the first and second objects to visually indicate that the first object is associated with the second object.

In particular embodiments, the first object may be an icon, link, and/or node and the second object may be a label that identifies the first object. The tether can be presented on the display so that it has an intensity that is reduced relative to an intensity associated with the first and second objects to visually reduce its prominence to a user.

In certain embodiments, the visual tether may be translucent and/or have a visual presentation that is substantially less prominent than active links or nodes and/or the graphically displayed objects so that a viewer can see the tether as a faint line or connector trace without visually cluttering the screen.

In particular embodiments, the visual tether can be dynamically adjustable in intensity and length. The intensity (i.e., its contrast relative to active objects, such as its darkness, color, boldness, line thickness and/or degree of translucence) may be adjusted to present an increased intensity as it is moved and/or positioned a further distance from its owner object. For example, when a related object is displayed a further distance from its owner object, the tether may have an increased length with an intensity that may be greater than the intensity of a shorter tether drawn for an owner object with an adjacently positioned related object.

The tether can be drawn on the display dynamically and automatically as the owner object such as an icon, node or link and/or its corresponding label are moved by a user about the viewing area of the display.

Other embodiments are directed to systems for providing a display of graphical objects on an electronic display. The systems can include: (a) means for displaying a plurality of corresponding pairs of first and second objects on an electronic display; and (b) means for displaying a tether that extends between each of the corresponding pairs of first and second objects on the electronic display.

Still other embodiments are directed to systems for displaying graphical objects on an electronic display that include: (a) a display circuit configured to display a plurality of corresponding pairs of first objects with associated labels on an electronic display; and (b) a tether display circuit configured to display a respective tether that visually extends between and relates each corresponding first object and associated label pair displayed on the electronic display.

Additional embodiments of the present invention are directed toward computer program products for displaying graphical objects on an electronic display. The computer program products include a computer readable medium having computer readable program code embodied therein. The computer readable program code includes: (a) computer readable program code configured to display a plurality of corresponding pairs of first and second objects on an electronic display; and (b) computer readable program code configured to display a tether that extends between each of the corresponding pairs of first and second objects on the electronic display.

In particular embodiments, the computer program product can include computer readable program code for obtaining user input that allows a user to selectively move one or both of the first and/or second object in a corresponding pair on the display and computer readable program code that automatically dynamically reconfigures the tether in response thereto.

As will further be appreciated by those of skill in the art, features of the present invention may be embodied as methods, apparatus/systems and/or computer program products.

DETAILED DESCRIPTION

Figure 1:
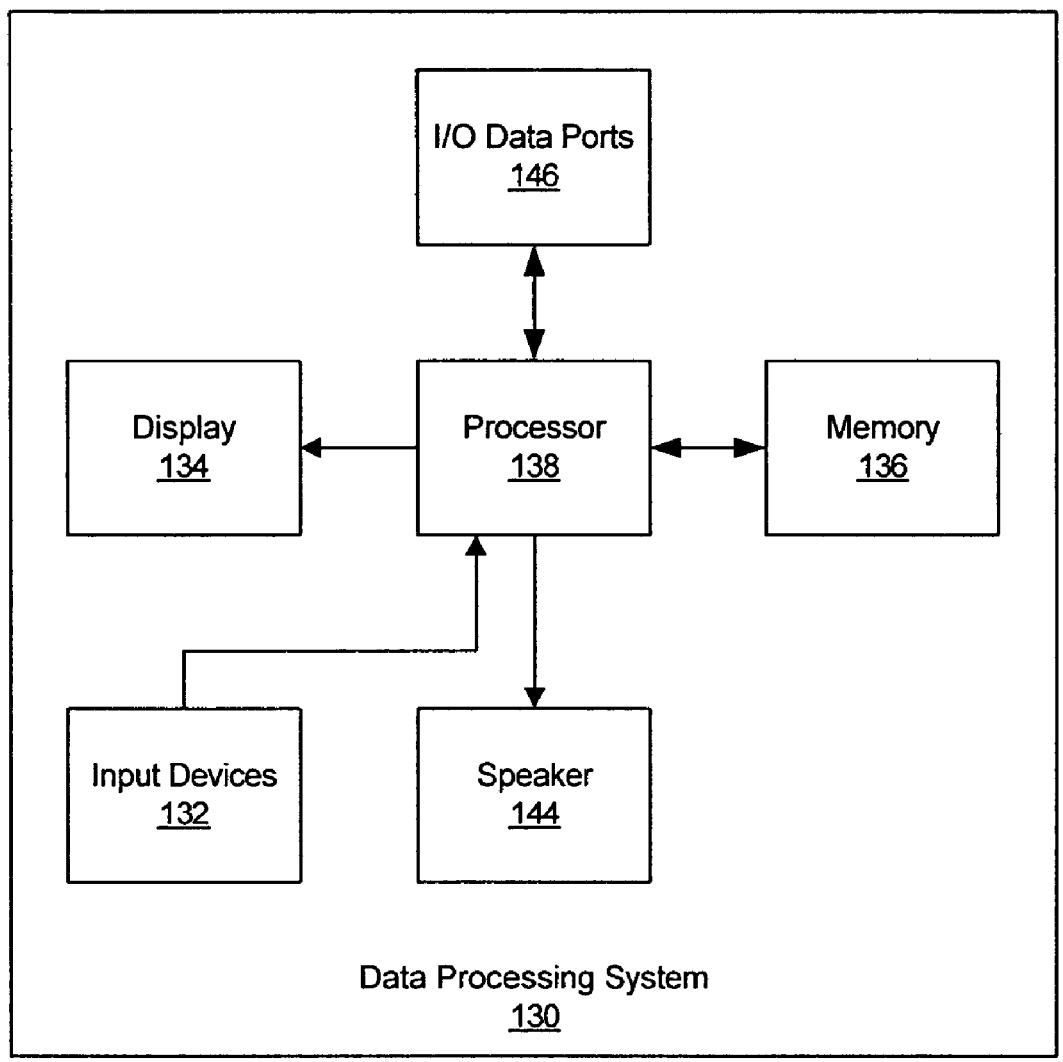
FIG. 1 is a block diagram of a data processing system suitable for use in embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, certain features or components may be exaggerated for clarity. Also, broken lines indicate optional features or steps unless stated otherwise.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described in part below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Embodiments of the present invention provide for methods, systems and computer program products that generate tethers to visually connect an owner object with a related object. As used herein, the term "tether" means a visual connection generated on an electronic display that extends between two different objects, typically between a first object and a second object. Opposing end portions of the tether may be configured to abut or overlay the two objects or may be configured to end without contacting the two objects themselves. The tether may be continuous or discontinuous. The tether may be used to visually relate more than two objects.

The first object may be a graphically displayed object such as an icon, a link, a node, a map, and/or other target object. The second object can be a related label, function, application, process, image, symbol and/or other object. Typically, the tether is a line that has no functional purpose other than to visually relate the two objects to a viewer. That is, in contrast to a link, which can represent real world resources with status, the tether can be used solely to visually connect and/or relate an object such as a label to a link or other intended object.

For example, the tether can visually relate a label to its target object (such as a link, node and/or application) to aid a user in contemporaneously visually relating and recognizing which object a label belongs to. The display and/or topological depiction can be carried out such that multiple tethers are shown on a single screen with a respective tether drawn to connect each label to a corresponding object or component such as link, an application and a node in a screen display.

The tether may be translucent and/or have a visual presentation that is substantially less prominent than active links or nodes and/or the graphically displayed objects so that a viewer can see the tether as a relatively faint line or connector trace without visually cluttering the screen. The tethers may be dynamically adjustable and automatically generated. Tethers may be particularly suitable for use when a display presents a plurality of closely positioned objects having corresponding labels so that a label is positioned proximate two different objects, which, in the past, potentially caused some confusion as to which object the label referred.

In particular embodiments, the visual tether is dynamically automatically adjustable in intensity and/or length responsive to where a user and/or graphical user interface positions either or both a first and/or owner object and the second object on the display screen. The intensity (i.e., its contrast such as its darkness, color, boldness, line thickness and/or degree of translucence) may be adjustable so as to present an increased intensity as the tether length is increased and/or as the two related objects are spaced (or moved) further apart. For example, when a related object is displayed a further distance from its owner object, the tether may have an increased length with an intensity that may be greater than the intensity of a shorter tether drawn for an owner object with a more closely positioned or an adjacent related object. The lesser intensity for shorter tethers can reduce visual clutter when a label or other object is positioned relatively close to its intended owner object when visual support is less likely to be required and increased when a label or other secondary object is a further distance away from its intended owner object and likely to increase the uncertainty of what the label or other secondary object belongs to. This adjustability may be particularly suitable for graphic displays that are heavily or densely populated with objects. The tether may be presented in the same color as the selection color of the active elements. In particular embodiments, the tethers may be presented in a light purple hue.

In certain embodiments, tether can be configured so that the translucency and/or semi-transparency is adjustable between about 0 to 255 (with 255 providing an opaque line and 0 providing a transparent line). Typically, the tether translucency will be selectable between pixel intensity values of about 1-250. Embodiments of the invention may define a threshold lower and upper value so that the pixel intensity does not become opaque even for longer tethers (i.e., all tethers above a predetermined length can have the same intensity and all tethers below a predetermined length can have the same intensity, albeit with an intensity that is less than the longer tethers).

The tether may be a straight line drawn between the two objects or orthogonal, curvilinear or other visual lead, line, or trace configuration. The tether line may be configured as a series of aligned alphanumeric or other symbols (such as x's) or may be a line generated with a thin pixel width, such as less than three pixels wide, and typically, about 1 pixel in width.

Various embodiments of the present invention will now be described with reference to the figures. FIG. 1 illustrates an exemplary embodiment of a data processing system 130 suitable for a server and network traffic associated with the replicated server in accordance with embodiments of the present invention. The data processing system 130 typically includes input device(s) 132 such as a keyboard, pointer, mouse and/or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 2:
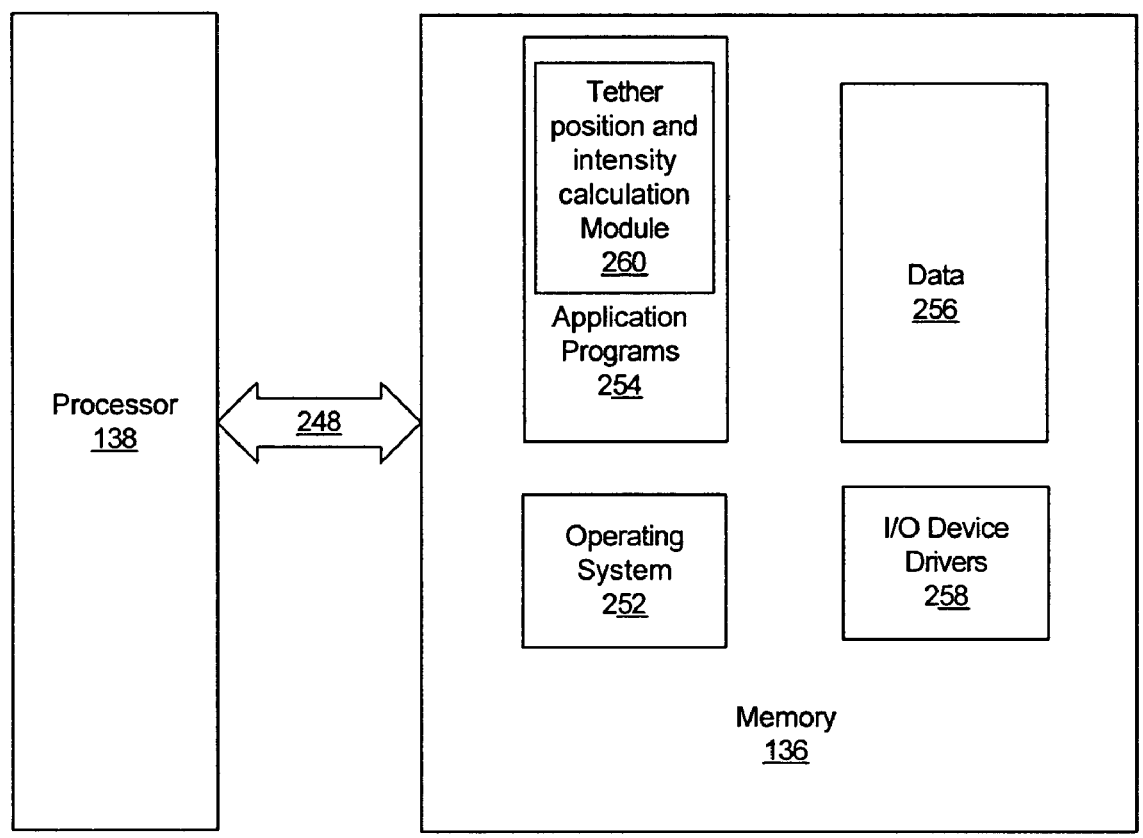
FIG. 2 is a block diagram of aspects of a data processing system that may be used in embodiments of the present invention.

FIG. 2 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices, and may contain the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256, which may include data sets defining the location and type of first and second objects being displayed. As will be appreciated by those of skill in the art, the operating system 252 may be any operating system suitable for use with a data processing system, such as OS/2, AIX or System 390 from International Business Machines Corporation, Armonk, N.Y., Windows95, Windows98, Windows2000 or WindowsXP from Microsoft Corporation, Redmond, Wash., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 may include a tether position and intensity calculation module 260. The tether module 260 may carry out the operations described herein for selectively controlling the graphical display of objects on an electronic display. While the present invention is illustrated, for example, with reference to the tether module 260 being an application program in FIG. 2, as will be appreciated by those of skill in the art, other configurations may also be utilized while still benefiting from the teachings of the present invention. For example, the tether module 260 may also be incorporated into the operating system 252, the I/O device drivers 258 or other such logical division of the data processing system 130. Thus, the present invention should not be construed as limited to the configuration of FIG. 2 but is intended to encompass any configuration capable of carrying out the operations described herein.

Figure 3:
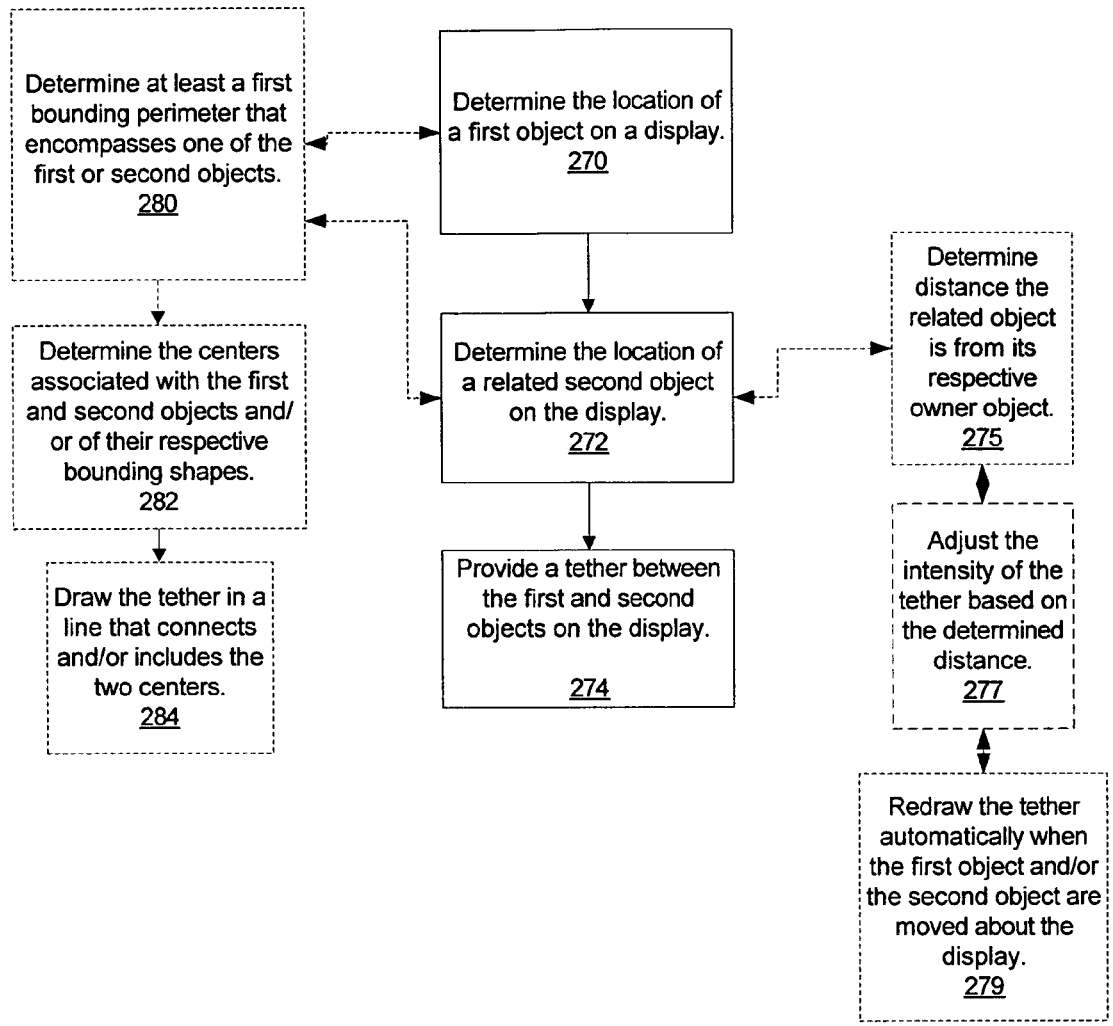
FIG. 3 is a flow diagram of operations that can be carried out according to embodiments of the present invention.

FIG. 3 is a flowchart of operations that can be used to carry out embodiments of the present invention. As shown, the location of a first graphic object on an electronic display can be determined (block 270). The location of a second related object can also be determined (block 272). The tether can be drawn between the first and second objects (block 274).

In certain embodiments, the distance between the first and second objects can be determined or calculated (block 275). The intensity of the tether can be adjusted based on the determined distance (block 277). The tether can be automatically redrawn when the first and second objects are moved closer or further from each other (block 279). In certain embodiments, the coordinates of the respective substantially geometric centers of the two objects can be determined to assess the distance between the two objects. In particular embodiments, the distance can be calculated as the straight-line distance between the two centers. Other techniques for establishing a distance between the two objects can also be used. For example, the distance can be established by the distance between the closest side or portion of the two objects. Alternatively, a centroid location of each object may be used to assess the distance between the two objects.

In particular embodiments, a first bounding shape having a perimeter with a known shape can be sized to enclose one of the first or second objects, and the center of the bounding perimeter can be determined (block 280). A second bounding shape may also be used to enclose the other of the first or second objects. The center of the bounding perimeter of one or both objects may be determined as the center of the corresponding object (block 280). The bounding perimeter may be shaped as a box, rectangle, circle or other desired shape. In other embodiments, the object may be configured to identify its own shape, length and/or position. In any event, the distance between objects can be used to determine how to configure the tether in position, length and and/or intensity.

The coordinates of the centers associated with the two objects and/or the bounding perimeters of the two objects can be used as points in a line used to define the tether. In particular embodiments, the two opposing end portions of the tether are the two center coordinates of the objects that it connects. The tether can be drawn in a line with a slope that connects or includes the two center points so as to include points with axial coordinates that include the calculated center points of the two objects (block 284). In other embodiments, the tether is drawn so that its' ends terminate adjacent to the objects but do not overlap with same.

Figure 4:
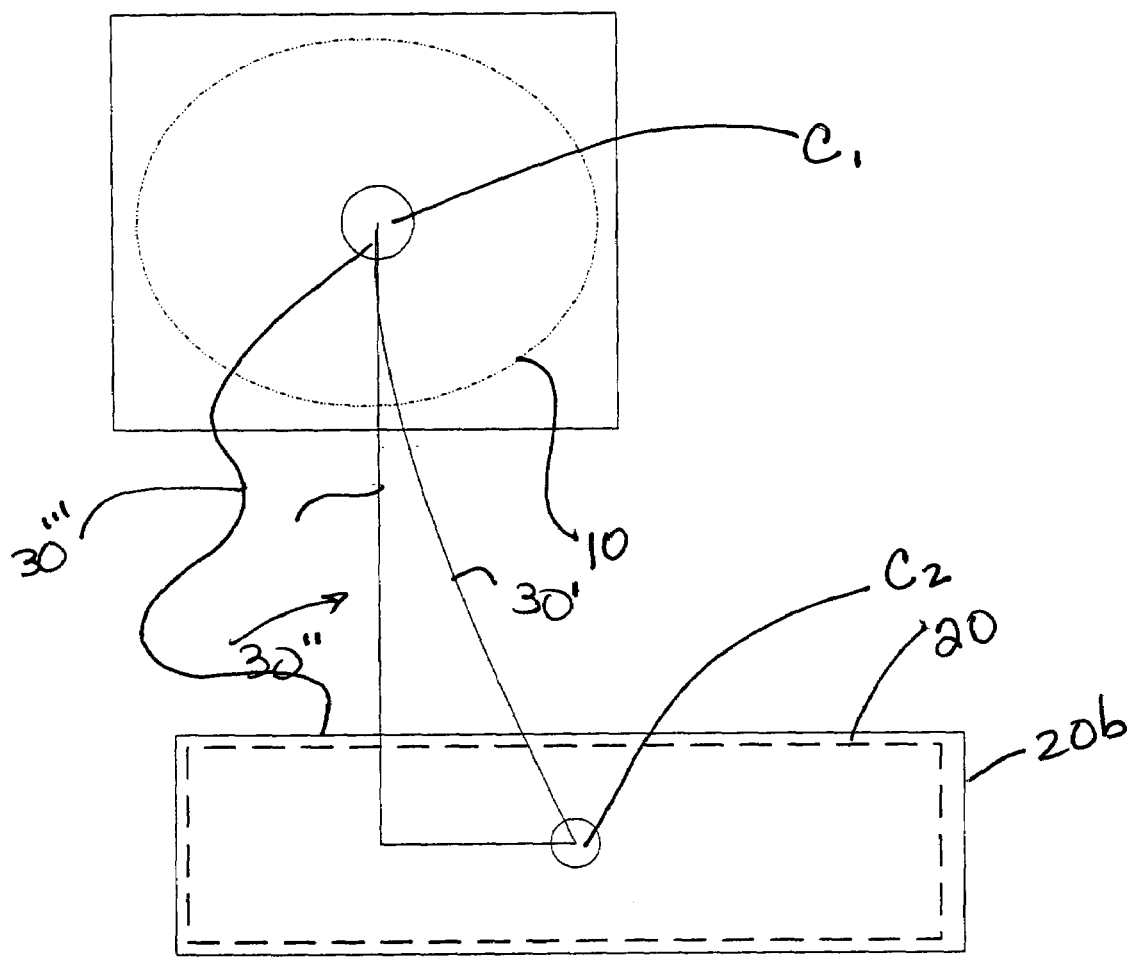
FIG. 4 is a schematic illustration of an exemplary method of dynamically drawing a tether between an owner and a related object.

FIG. 4 schematically illustrates one exemplary way to calculate an estimated or actual center location $C_1$ of a first object 10 and/or the center location $C_2$ of a second object 20. As shown, a substantially square bounding shape 10$b$ is sized and configured to encompass the perimeter of the first object 10 (the perimeter of the first object 10 is shown in broken line). The first object 10 is shown as being oval for discussion purposes and the shape of this object is not to be limited thereto. Knowing the shape of the bounding box, the coordinates of the location of the center $C_1$ can be determined. The second object 20 is shown as occupying a rectangular region. As before, the shape of the second object 20 is for discussion purposes and the shape of this object is not limited thereto. A rectangular shaped bounding shape 20$b$ (again shown as a box) can be configured and sized to encompass the second object 20 and the coordinates of the center $C_2$ determined.

In operation, a tether 30 can be drawn to extend between the objects 10, 20, as discussed above. Two exemplary tether configurations are shown, a substantially straight tether line 30', a tether line 30" with two orthogonal components, and a curvilinear tether line 30'''. Each tether 30 is shown as extending through the centers $C_1$, $C_2$. However, other tether configurations may also be used to visually illustrate on an electronic display that two objects are related (not shown) and the tethers 30 need not connect the centers of the objects or extend into and/or over or under the object shapes 10, 20 themselves, as discussed above. For example, the tether may be presented so that it extends between the closest sides or perimeter segments and/or so that the tether connects a bottom of a top object to a top of a bottom or lower object, and the like. In addition, the two objects 10, 20 are shown as spaced apart in a two-dimensional relationship with the tether 30 drawn accordingly. However, according to alternative embodiments, the two objects 10, 20 may be spaced apart in one-dimensional space, two-dimensional space or three-dimensional space with the tether 30 drawn accordingly with the corresponding associated reference axes.

In particular embodiments, the distance between the two objects 10, 20 can be calculated using the x,y coordinates of their respective centers ($C_1$: x1, y1 and $C_2$, x2, y2) using the following equations.

$$dx=(x1-x2); \quad \text{Equation (1)}$$

$$dy=(y1-y2); \quad \text{Equation (2)}$$

$$dist=\text{Math.sqrt}((dx*dx+dy*dy)); \quad \text{Equation (3)}$$

return (dist);

As noted above, the intensity of the tether 30 may be configured to depend on the distance between the two objects 10, 20. Thus, the intensity of each tether 30 in or on a display can be adjusted based on the calculated distance between its related objects 10, 20. The intensity of the tether 30 may correspond to the length of the tether 30 when the tether is drawn as a substantially straight line between the corresponding (typically pair) of objects 10, 20. For example, the maximum distance between two objects for intensity calculation purposes can be set to about 50 (such as 50 pixels or 50 mm). Any objects at this distance or greater can have the same tether intensity. The tether intensity can be calculated or adjusted as a function of the separation distance between object pairs. For example, a constant or other factor Z can be multiplied to the distance D to provide an intensity value of DZ. If maximum opacity or intensity is 255 (such as it may be in JAVA) a multiplier of five (5) may be used to define the tether intensity. In operation, for separation distances that are less than a few pixels, no tether may be visible. The minimum intensity may also be configured so that no tether line is shown for objects separated only a short distance (and/or short tether lines) or the multiplier may be defined so that small distances (such as less than about 3 pixels) are faint and barely visible or substantially transparent to a human eye in a non-magnified viewing area.

Figure 5A:
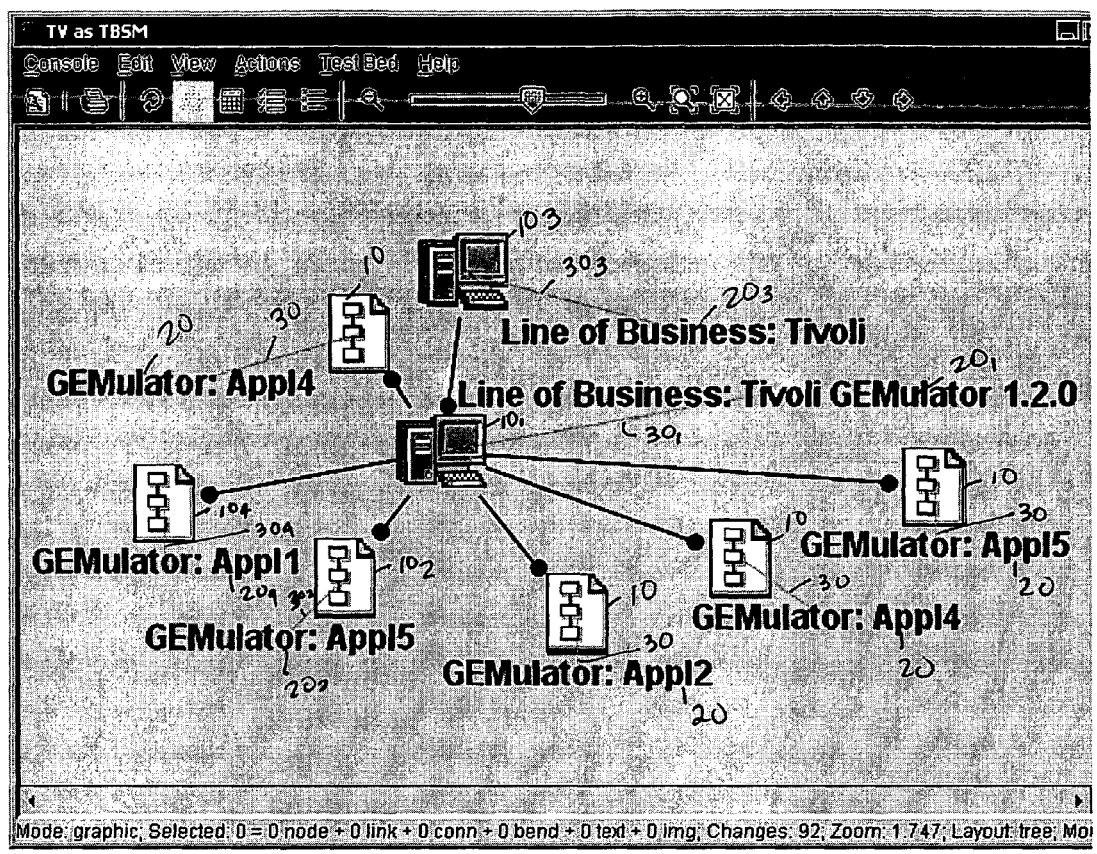
FIG. 5A is a screen printout of a topological view of a graphical user interface of resources and/or applications with tethers connecting labels to respective owner objects according to embodiments of the present invention.
Figure 5B:
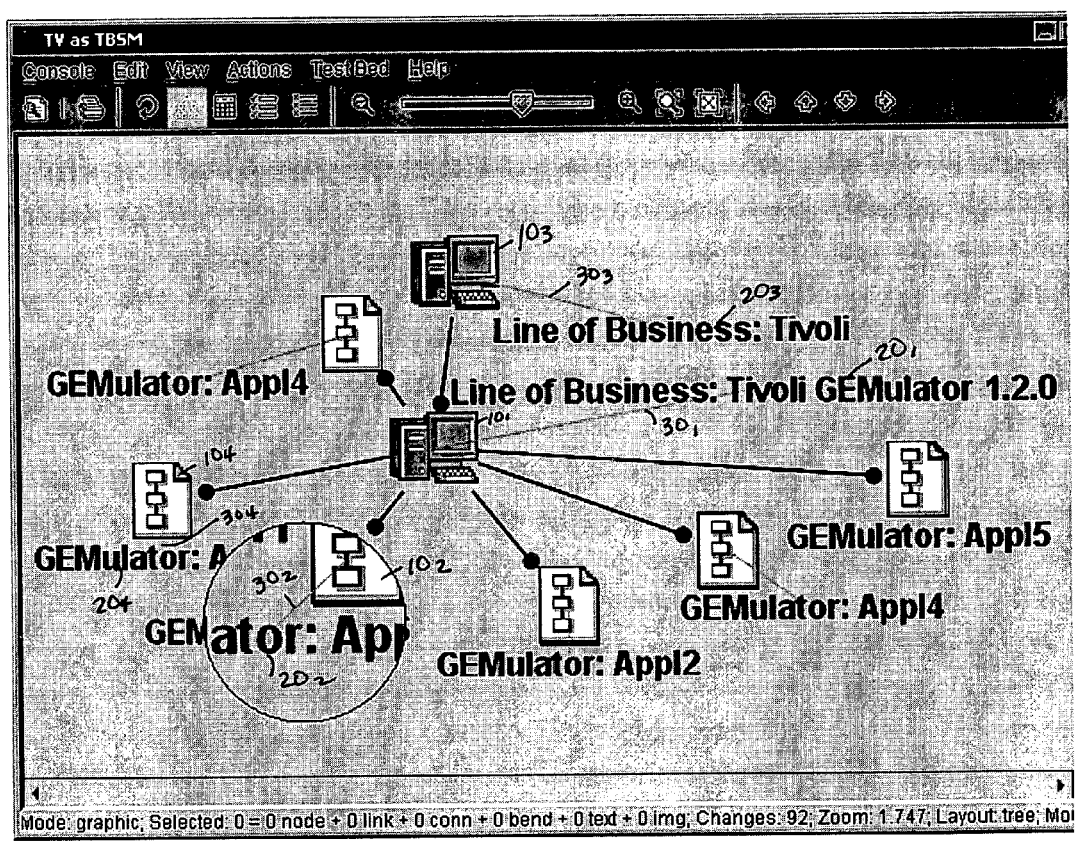
FIG. 5B is the screen printout shown in FIG. 5A with one tether magnified according to embodiments of the present invention.

FIGS. 5A and 5B illustrate an exemplary topology or screen view of a plurality of first and second graphical objects 10, 20 (which define a corresponding pair of objects) and their associated tethers 30. For discussion purposes, four sets of objects 10, 20 with respective tethers 30 have been separately numbered with subscripts in FIGS. 5A and 5B: $10_1, 20_1, 30_1$; $10_2, 20_2, 30_2$; $10_3, 20_3, 30_3$; and $10_4, 20_4, 30_4$. The longest tether shown is associated with tether 30, which extends between first object $10_1$ (shown as a computer icon) and its related object $20_1$ (shown as a rather lengthy label). As shown, the tether $30_1$ is a faint relatively low intensity line (having an intensity that is substantially less than the corresponding objects $10_1, 20_1$. In contrast, the tether $30_4$ is relatively short with its line intensity reduced so that is has even less intensity than that of tether $30_1$. FIG. 5B illustrates the same display as that shown in FIG. 5A, but with link $30_2$ and corresponding objects $10_2, 20_2$, magnified for clarity.

Figure 6A:
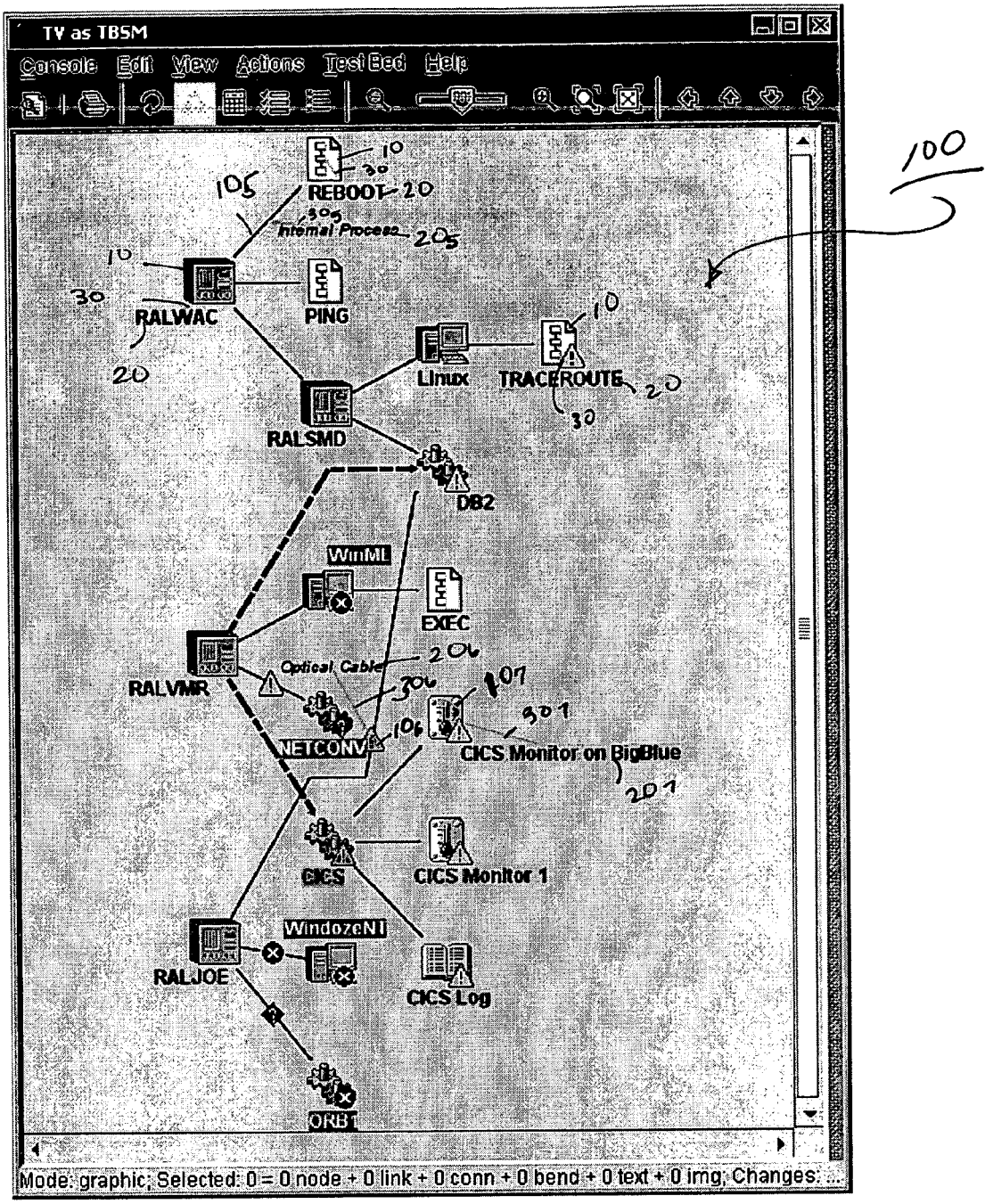
FIG. 6A is a screen printout of a topological view of a graphical user interface with variable length relational tethers.

FIG. 6A is a screen view of a display illustrating another embodiment of graphic objects employing tethers 30. Tethers $30_5$ and $30_6$ have the most visible intensity (being longer and/or their object pair offset further from each other). While tethers 30 may be present for the other objects, they may not be as visually dominant as tethers $30_5, 30_6$. In addition, tethers $30_5, 30_6$ are semi-transparent or translucent with reduced intensity relative to their intended object pairs $10_5$, $20_5$, and $10_6, 20_6$.

Figure 6B:
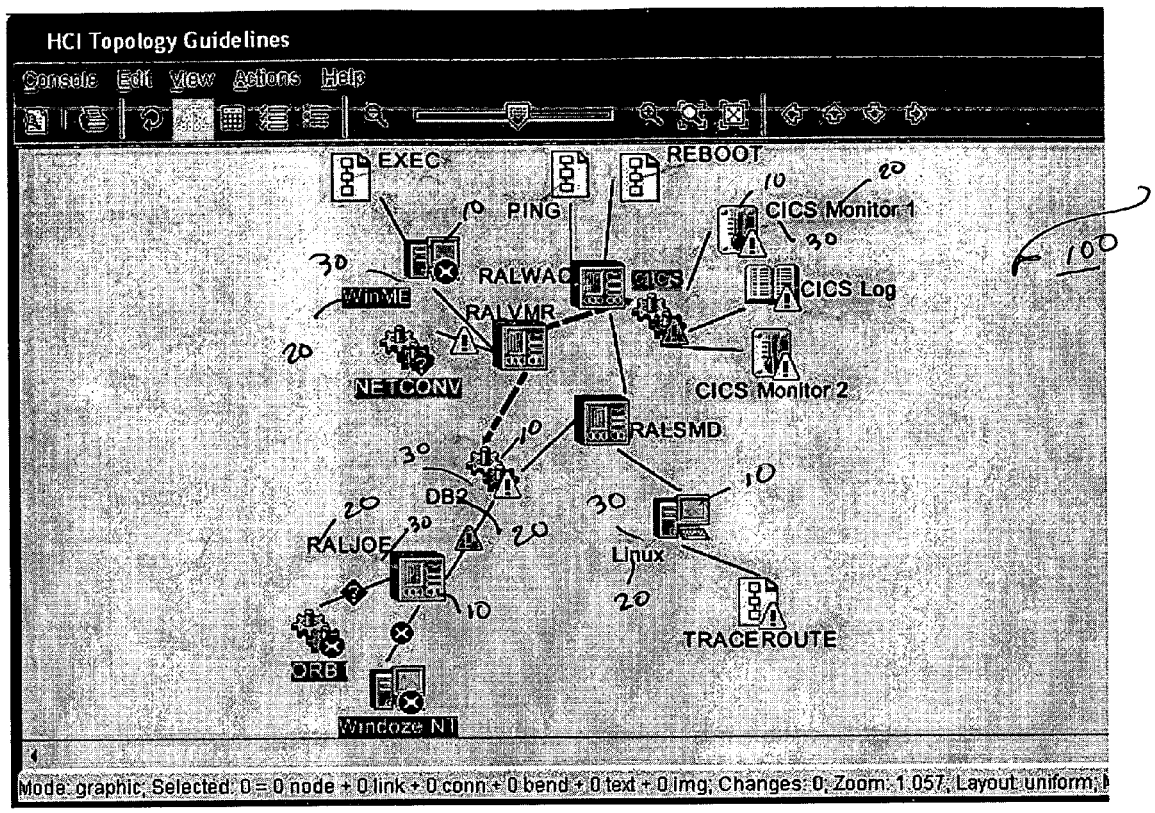
FIG. 6B is a screen printout of a topological view of the graphical user interface shown in FIG. 6A with labels reoriented to allow for improved use of real estate while maintaining a visual relationship with tethers according to embodiments of the present invention.
Figure 7:
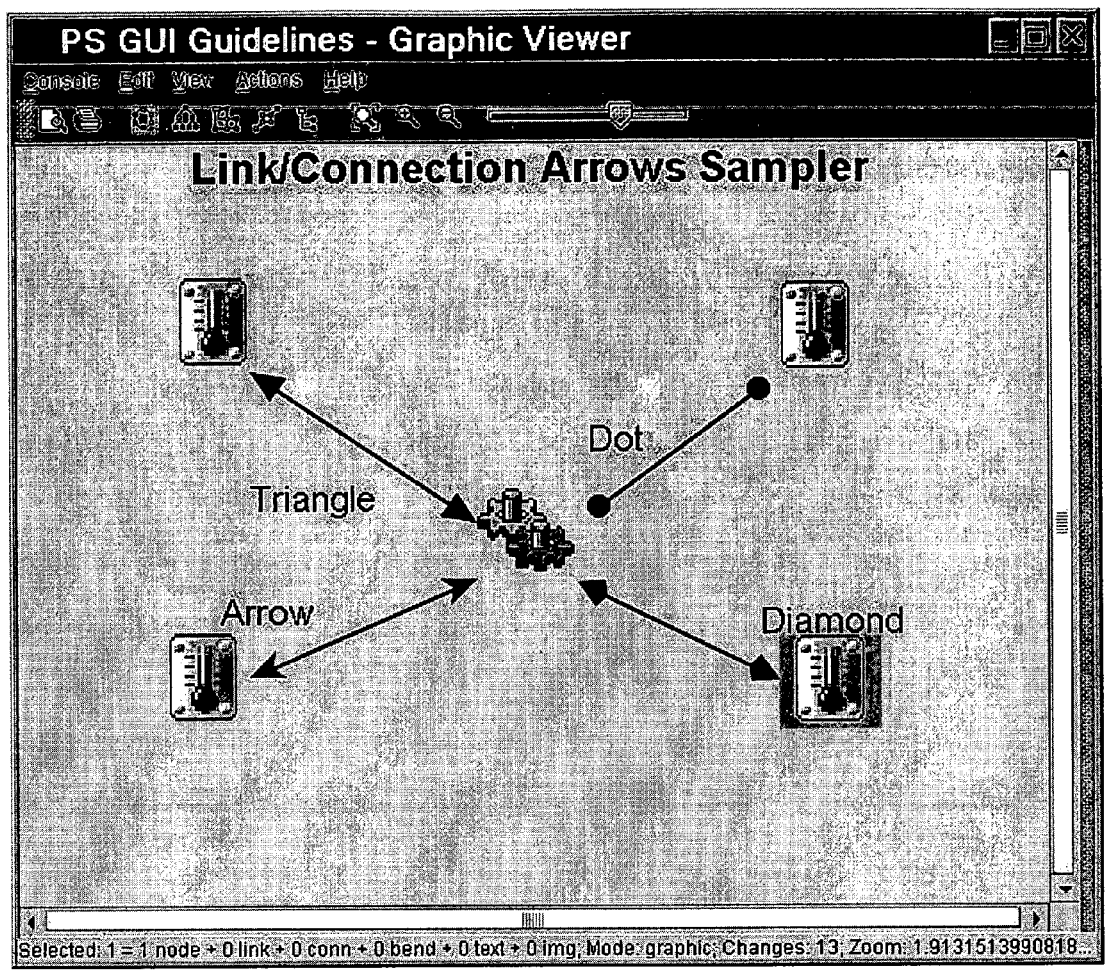
FIG. 7 is a screen printout of a topological view of a graphical user interface without the use of tethers.

FIG. 6B is an alternative arrangement of features or objects shown in FIG. 6A. The alternative arrangement is configured to employ less screen "real-estate" and yet present the objects 10, 20 so that a user can readily identify the relationship between objects using tethers 30 provided by embodiments of the present invention. In FIGS. 6A and 6B, not all tethers 30 and related object pairs have been numbered for ease of reference. FIG. 7 illustrates a screen display with objects presented without the benefit of tethers 30.

The objects displayed using tethers according to embodiments of the present invention can include workflows, graph layouts of links and nodes (an entry in a level or a hierarchical diagram or dataset such as a root node, leaf or non-leaf node, child node, parent node, node branch, ancestor nodes), other graphic displays that include related objects such as maps with city names, highway names, and other related data, or other graphic display, particularly situations where it may be hard to identify an objects true location or relationship to another object in a conventional manner due to small layout areas or volume, and/or a clustering of indicia, symbols and/or text.

The tethers may be useful for any electronic display and may be particularly useful for smaller displays given the recent proliferation of numerous handheld computing devices such as Personal Data Assistants ("PDA"), inventory tracking handheld computers, cell phones and the like which typically have physically small electronic displays.

The flowcharts and block diagrams illustrate the architecture, functionality, and operation of possible implementations of systems, methods and computer program products for providing tethers used in graphical user interfaces according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed:

1. A method for displaying graphical objects on an electronic display, the method comprising:
displaying a first object on an electronic display and an associated second object so that the second object is spaced apart a distance from the first object, wherein the first object includes an active link and/or application, and the second object includes an object identifier; and
extending a visual non-functional tether between the first and second objects to visually indicate that the first object is associated with the second object, wherein the tether has an intensity, and wherein the method further comprises dynamically adjusting the intensity of the tether as the first and/or second objects are moved toward and/or away from each other.

2. A method according to claim 1, wherein the object identifier is a label that identifies the first object.

3. A method according to claim 2, wherein the first object is an icon.

4. A method according to claim 1, wherein the tether has an intensity that is reduced relative to an intensity associated with the first and second objects to visually reduce its prominence to a user.

5. A method according to claim 1, wherein the tether is translucent and/or semi-transparent.

6. A method according to claim 1, wherein the intensity of the tether is increased as the length of the tether used to visually connect the first and second objects increases.

7. A method according to claim 1, wherein the displaying and drawing steps are repeated a plurality of times to provide a graphical user display of a plurality of first objects and a corresponding plurality of second objects with a respective tether extending between corresponding pairs of first and second objects to visually relate the corresponding first and second objects to a user.

8. A method according to claim 1, further comprising calculating a distance between the position of the first object and the second object and defining the tether intensity based on the calculated distance.

9. A method according to claim 8, wherein the defining tether intensity is carried out so that the maximum tether intensity is less than the maximum potential intensity of pixels associated with the tether image.

10. A method according to claim 8, wherein any tether having a length that is over a predetermined length has the same maximum tether intensity that is semi-transparent and/or translucent.

11. A method according to claim 8, wherein calculating the distance comprises determining a substantially geometric center of the first and second objects and calculating a distance between the two centers.

12. A method according to claim 11, wherein extending the tether between the first and second objects is carried out so that the tether is a line with a slope and length that includes the coordinates of the two calculated centers.

13. A method according to claim 11, wherein determining the substantially geometric center of the first and second objects comprises determining a boundary perimeter using a known shape with an associated center that encloses the first object.

14. A method according to claim 1, wherein the tether is a translucent and/or semi-transparent line having a line width of about 1 pixel to thereby provide a tether that is able to visually blend into its topological environment allowing the first and second objects to provide an increased visual prominence relative thereto.

15. A method for displaying graphical objects on an electronic display, the method comprising:
displaying a first object on an electronic display and an associated second object so that the second object is spaced apart a distance from the first object, wherein the first object includes an active link and/or application, and the second object includes an object identifier;
extending a visual non-functional tether between the first and second objects to visually indicate that the first object is associated with the second object; and
dynamically automatically adjusting the position, intensity and/or length of the tether responsive to a movement of the first and/or second object on the display.

16. A system for providing a display of graphical objects on an electronic display comprising:
  means for displaying a plurality of corresponding pairs of first and second objects on an electronic display, wherein the first object includes an active link and/or application, and the second object includes an object identifier; and
  means for displaying a visual non-functional tether that extends between each of the corresponding pairs of first and second objects on the electronic display, wherein the means for displaying the tether is configured to provide a tether intensity that is reduced relative to an intensity associated with the first and second objects to reduce the tether's visual prominence to a user.

17. A system according to claim 16, further comprising means for obtaining user input for moving a first and/or second object on the electronic display and means for automatically adjusting the position, length and/or intensity of the tether responsive to the movement.

18. A system according to claim 16, wherein the object identifier is a text label that identifies the first object.

19. A system according to claim 18, wherein the first object is an icon.

20. A system according to claim 16, wherein the means for displaying the tether is configured to generate tethers that are translucent and/or semi-transparent.

21. A system according to claim 16, wherein the tether has an intensity, and wherein the system further comprises means for dynamically adjusting the intensity of the tether as the first and/or second objects are moved toward and/or away from each other.

22. A system according to claim 21, wherein the intensity of the tether is increased as the length of the tether used to visually connect the first and second objects increases.

23. A system according to claim 16, further comprising means for calculating a distance between the position of the first object and the second object and means for defining tether intensity based on the calculated distance.

24. A system according to claim 16, further comprising means for calculating the coordinates of a substantially geometric center of the first and second objects and means for calculating a straight-line distance between the two calculated centers.

25. A system according to claim 24, wherein the means for displaying a tether is carried out to generate a respective tether between an associated pair of first and second objects so that the tether is a line with a slope and length that includes the coordinates of the two calculated centers.

26. A system according to claim 24, wherein the means for calculating the substantially geometric center of the first object is configured to size and configure a known bounding shape with an associated center to substantially enclose the first object.

27. A system according to claim 16, wherein the means for displaying the tethers is configured to generate a translucent and/or semi-transparent tether line having a line width of about 1 pixel to thereby visually blend the tether into its topological environment allowing the first and second objects to provide an increased visual prominence relative. thereto.

28. A system according to claim 16, further comprising means for dynamically automatically adjusting the position, intensity and/or length of the tether on the display responsive to a movement of the first and/or second object on the display.

29. A system for providing a display of graphical objects on an electronic display comprising:
  means for displaying a plurality of corresponding pairs of first and second objects on an electronic display, wherein the first object includes an active link and/or application, and the second object includes an object identifier;
  means for displaying a visual non-functional tether that extends between each of the corresponding pairs of first and second objects on the electronic display; and
  means for adjusting tether intensity based on tether length and/or the distance between the associated pair of first and second objects.

30. A system for displaying graphical objects on an electronic display comprising:
  a display circuit configured to display a plurality of corresponding pairs of first objects with associated labels on an electronic display, wherein the first object includes an active link and/or application; and
  a non-functional visual tether display circuit configured to display a respective tether that visually extends between and relates each corresponding first object and associated label pair displayed on the electronic display, wherein a plurality of the corresponding pairs of first objects and labels are configured so that a respective label is positioned spaced apart a distance from the corresponding object, and wherein the tether display circuit is configured to provide a tether intensity that is reduced relative to an intensity associated with the first object and label to reduce the tether's visual prominence to a user.

31. A system according to claim 30, wherein the tether display circuit is configured to provide tethers that are translucent and/or semi-transparent.

32. A system according to claim 30, further comprising means for obtaining user input for selectively moving a desired first object and/or label on the electronic display and means for automatically adjusting the position, length and/or intensity of a corresponding tether responsive to the movement thereof.

33. A system according to claim 30, wherein the tether display circuit is configured to adjust tether intensity based on tether length and/or the distance between the associated pair of first object and associated label.

34. A system according to claim 30, wherein the tether display circuit dynamically adjusts tether intensity as the first object and/or associated label are moved toward and/or away from each other.

35. A system according to claim 30, wherein the first objects are icons.

36. A system according to claim 30, wherein the tether display circuit is configured to calculate a distance between the position of the first object and label pair and define tether intensity of a respective tether based on the calculated distance.

37. A system according to claim 30, wherein the tether display circuit is configured to calculate a substantially geometric center of the first object and the label and to calculate a straight-line distance between the two calculated centers.

38. A system according to claim 37, wherein the tether display circuit is configured to generate a respective tether between a respective object and label pair so that the tether is a line with a slope and length that includes the coordinates of the two calculated centers.

39. A system according to claim 38, wherein the tether display circuit is configured to generate a translucent and/or semi-transparent tether line having a line width of about 1 pixel to thereby visually blend the tether into its topological environment allowing the object and associated label to provide an increased visual prominence relative thereto.

40. A system according to claim 30, wherein the tether display circuit is configured to dynamically automatically adjust the position, intensity and/or length of a tether on the display responsive to a movement of a corresponding label and/or object on the display.

41. A system for displaying graphical objects on an electronic display comprising:
 a display circuit configured to display a plurality of corresponding pairs of first objects with associated labels on an electronic display, wherein the first object includes an active link and/or application; and
 a non-functional visual tether display circuit configured to display a respective tether that visually extends between and relates each corresponding first object and associated label pair displayed on the electronic display, wherein the tether display circuit is configured to increase tether intensity as the length of the tether used to visually connect the first object and associated label increases.

42. A computer program product for displaying graphical objects on an electronic display comprising:
 a computer readable medium having computer readable program code embodied therein, the computer readable program code comprising:
 computer readable program code configured to display a plurality of corresponding pairs of first and second objects on an electronic display, wherein the first object includes an active link and/or application, and the second object includes an object identifier;
 computer readable program code configured to display a visual non-functional tether that extends between each of the corresponding pairs of first and second objects on the electronic display; and
 computer readable program code that is configured to adjust tether intensity based on tether length and/or the distance between the associated first and second object pair.

43. A computer program product according to claim 42, further comprising computer readable program code for obtaining user input that allows a user to selectively move one or both of the first and/or second object in a corresponding pair on the display and computer readable program code that automatically dynamically reconfigures the tether in response thereto.

44. A computer program product according to claim 42, wherein the computer readable program code that displays a tether for each of the corresponding pairs of objects is configured to provide tethers that are translucent and/or semi-transparent.

45. A computer program product according to claim 42, further comprising computer readable program code for automatically adjusting the position, length and/or intensity of a corresponding tether responsive to the movement thereof on the display.

46. A computer program product according to claim 42, further comprising computer readable program code that is configured to provide a tether intensity that is reduced relative to an intensity associated with the first and second object pair to reduce the tether's visual prominence to a user.

47. A computer program product according to claim 42, wherein the computer readable program code that is configured to adjust tether intensity is configured to increase tether intensity as the length of the tether used to visually connect the first and second object pair increases.

48. A computer program product according to claim 42, wherein the first objects are icons, and wherein the second objects are labels.

49. A computer program product according to claim 42, further comprising computer readable program code configured to calculate a distance between the position of the first object and second object pair and define tether intensity of the respective tether based on the calculated distance.

50. A computer program product according to claim 42, further comprising computer readable program code that is configured to calculate coordinates of a substantially geometric center of the first object and of the second object and to calculate a straight-line distance between the two calculated centers.

51. A computer program product according to claim 50, further comprising computer readable program code that is configured to generate a tether between an object pair so that the tether is a line with a slope and length that includes the coordinates of the two calculated centers.

52. A computer program product according to claim 42, wherein the computer program code that configured to display a tether that extends between each of the corresponding pairs of first and second objects on the electronic display comprises computer program code that is configured to generate a translucent and/or semi-transparent tether line having a line width of about 1 pixel to thereby visually blend the tether into its topological environment allowing the first and second objects to provide an increased visual prominence relative thereto.

53. A computer program product according to claim 42, wherein the computer readable program code configured to display a tether that extends between each of the corresponding pairs of first and second objects on the electronic display comprises computer readable program code configured to dynamically automatically adjust the position, intensity and/or length of a tether on the display responsive to a movement of a corresponding first and/or second object on the display.

54. A computer program product according to claim 42, wherein the first object is an icon, and wherein the second object is a label for same.

* * * * *